(12) United States Patent
Masuda et al.

(10) Patent No.: US 10,557,450 B2
(45) Date of Patent: Feb. 11, 2020

(54) INTERNAL COMBUSTION ENGINE

(71) Applicant: KABUSHIKI KAISHA TOYOTA CHUO KENKYUSHO, Nagakute-shi, Aichi-ken (JP)

(72) Inventors: Ryou Masuda, Nagakute (JP); Takayuki Fuyuto, Nagakute (JP); Makoto Nagaoka, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 73 days.

(21) Appl. No.: 15/429,762

(22) Filed: Feb. 10, 2017

(65) Prior Publication Data
US 2017/0234287 A1    Aug. 17, 2017

(30) Foreign Application Priority Data
Feb. 16, 2016    (JP) ................................ 2016-027249

(51) Int. Cl.
| F02P 15/00 | (2006.01) |
| H01T 13/00 | (2006.01) |
| H01T 13/32 | (2006.01) |
| F02B 23/08 | (2006.01) |
| H01T 13/54 | (2006.01) |

(52) U.S. Cl.
CPC ............ *F02P 15/006* (2013.01); *F02B 23/08* (2013.01); *H01T 13/00* (2013.01); *H01T 13/32* (2013.01); *H01T 13/54* (2013.01); *Y02T 10/125* (2013.01)

(58) Field of Classification Search
CPC ......... H01T 13/00; H01T 13/40; H01T 14/00; Y02T 10/125; F02B 2023/106
See application file for complete search history.

(56) References Cited

U.S. PATENT DOCUMENTS

| 2,164,578 | A | * | 7/1939 | Doyle | ..................... H01T 13/32 |
| | | | | | 313/141 |
| 4,098,246 | A | * | 7/1978 | Noguchi | ................. F02B 19/12 |
| | | | | | 123/260 |

(Continued)

FOREIGN PATENT DOCUMENTS

| JP | 2007-323903 A | 12/2007 |
| JP | 2015-076193 A | 4/2015 |

(Continued)

OTHER PUBLICATIONS

Claim 2 Diagrammatical Aid.*

*Primary Examiner* — Carl C Staubach
(74) *Attorney, Agent, or Firm* — Oliff PLC

(57) ABSTRACT

An internal combustion engine includes a spark plug which protrudes into a combustion chamber. The spark plug has a central electrode and a ground electrode, and is configured such that a spark is generated between the central electrode and the ground electrode by electrical discharge. The spark plug has a vortex generator that separates an air flow near the ground electrode from the ground electrode and generates a vortex at a downstream side. The central electrode and the ground electrode are placed in a manner such that a spark or a flame deformed by an air flow flowing between the central electrode and the ground electrode enters the trailing vortex, or the spark penetrates through the inside of the trailing vortex.

6 Claims, 13 Drawing Sheets

(56) References Cited

U.S. PATENT DOCUMENTS

| | | | | | |
|---|---|---|---|---|---|
| 4,109,633 | A * | 8/1978 | Mitsudo | | H01T 13/20 123/169 EL |
| 4,119,065 | A * | 10/1978 | Noguchi | | F02B 19/1066 123/262 |
| 4,176,646 | A * | 12/1979 | Nakamura | | F02P 9/007 123/260 |
| 4,178,903 | A * | 12/1979 | Yanagihara | | F02B 19/1085 123/259 |
| 4,218,992 | A * | 8/1980 | Latsch | | F02B 19/08 123/260 |
| 4,288,714 | A * | 9/1981 | Yamada | | H01T 13/20 313/142 |
| 4,305,357 | A * | 12/1981 | Scherenberg | | F02B 1/02 123/254 |
| 4,930,473 | A * | 6/1990 | Dietrich | | F02B 19/12 123/169 EL |
| 5,577,471 | A * | 11/1996 | Ward | | F02P 3/0884 123/169 EL |
| 5,950,584 | A * | 9/1999 | Bubeck | | H01T 13/52 123/169 E |
| 6,225,752 | B1 * | 5/2001 | Matsubara | | H01T 13/38 123/169 EL |
| 6,495,948 | B1 * | 12/2002 | Garrett, III | | H01T 13/32 123/169 EL |
| 8,258,686 | B2 * | 9/2012 | Kanao | | H01T 13/39 123/169 EL |
| 2005/0194877 | A1 * | 9/2005 | Horn | | H01T 13/32 313/141 |
| 2008/0092839 | A1 * | 4/2008 | Hanashi | | H01T 13/18 123/169 R |
| 2008/0309213 | A1 * | 12/2008 | Yorita | | H01T 13/32 313/141 |
| 2009/0309475 | A1 * | 12/2009 | Tozzi | | F02B 19/08 313/143 |
| 2011/0175515 | A1 * | 7/2011 | Kameda | | H01T 13/32 313/141 |
| 2014/0026848 | A1 * | 1/2014 | Abe | | F02P 23/045 123/297 |
| 2014/0318490 | A1 * | 10/2014 | Hanashi | | F02P 13/00 123/169 R |

FOREIGN PATENT DOCUMENTS

| JP | 2015-124674 A | 7/2015 |
|---|---|---|
| WO | 2015/097508 A1 | 7/2015 |

* cited by examiner

SPARK OF APPROXIMATELY STRAIGHT SHAPE
IMMEDIATELY AFTER START OF ELECTRICAL DISCHARGE (a)

DEFORMATION OF SPARK BY AIR FLOW (b)

ROOT OF SPARK MOVES TO ARM OF GROUND ELECTRODE (c)

SPARK AND FLAME DEFORMED BY AIR FLOW ENTER TRAILING VORTEX (d)

INTERNAL COMBUSTION ENGINE

CROSS REFERENCE TO RELATED APPLICATION

The entire disclosure of Japanese Patent Application No. 2016-027249 filed on Feb. 16, 2016, including the specification, claims, drawings, and abstract, is incorporated herein by reference in its entirety.

TECHNICAL FIELD

The present disclosure relates to an internal combustion engine having a spark plug protruding in a combustion chamber, wherein the spark plug includes a central electrode and a ground electrode, and is configured to generate a spark between the central electrode and the ground electrode by electrical discharge.

BACKGROUND

In the related art, internal combustion engines are proposed in which the shape of a spark plug is devised. For example, JP 2015-76193 A discloses a structure in which the spark plug has a bent shape such that an extension portion of a ground electrode of the spark plug extends into a combustion chamber, and a tip of the extension portion is directed toward a tip of the central electrode. In this structure, a through hole which is opened toward a gap between the tip of the central electrode and the tip of the ground electrode is formed on a wall surface of a tip portion of a housing near a base end of the ground electrode, and the through hole is inclined toward the gap between the electrodes with respect to a central axis direction of the spark plug. With such a structure, contact of the spark formed by electrical discharge of the spark plug with an upper wall surface of the combustion chamber can be suppressed.

JP 2015-124674 A discloses a structure in which the central electrode is provided at a tip of a ceramic insulator of the spark plug, and the ground electrode extends from the housing into the combustion chamber. A direction A of an air flow generated around the central electrode and the ground electrode upon ignition of the spark plug and a direction B of a connection portion of the central electrode with respect to the housing of the ground electrode as seen from the central electrode intersect each other. At a tip portion of the ground electrode, an inclined surface which is inclined to a side opposite a ceiling surface of the combustion chamber toward a downstream side of the direction A of the air flow is formed at a side opposite the central electrode. With such a configuration, contact of an initial flame generated from the electrical discharge spark with the ceiling surface of the combustion chamber is suppressed.

JP 2007-323903 A discloses a structure in which the spark plug includes a ground electrode which extends from an end of a tubular housing into the combustion chamber, and which forms an electrical discharge gap between the central electrode and the ground electrode. In the combustion chamber, a through hole is formed at the end of the housing. With such a configuration, the air flow in the combustion chamber enters inside the housing through the through hole, and flows from a region near the electrical discharge gap toward the inside of the combustion chamber, and thus, generation of the electrical discharge at a position different from the electrical discharge gap can be suppressed.

None of JP 2015-76193 A, JP 2015-124674 A, and JP 2007-323903 A discloses a structure in which a trailing vortex is created by the spark plug, and is used for flame holding which is a stable holding of the frame by ignition, to thereby promote and stabilize combustion. For example, the techniques of JP 2015-76193 A and JP 2015-124674 A are directed to suppressing contact of the spark or the flame to the upper wall surface of the combustion chamber. In the techniques of JP 2015-76193 A and JP 2015-124674 A, the spark and flame are sent to the downstream by the air flow, and the trailing vortex of the electrode is not used for flame holding.

The technique of JP 2007-323903 A is directed to suppressing generation of electrical discharge at a position different from the electrical discharge gap by blowing the spark between the electrical discharge gap by the air flow. In this technique, the through hole is merely used to set the direction of the air flow between the electrodes to be to the opposite side from the central electrode, and the trailing vortex of the electrode is not used for flame holding.

In the spark plug of the related art, the flame holding at the spark plug is not done under a flame-resisting condition such as high flow rate of the air flow and dilute combustion (lean A/F, EGR dilution), or the like, and high energy is necessary for stable ignition.

SUMMARY

An advantage of the present disclosure lies in the provision of a structure, in an internal combustion engine, which can realize stabilization of ignition, promotion of combustion, and stabilization of combustion with an energy equivalent or less than that used in the related art even under flame-resisting conditions.

According to one aspect of the present disclosure, there is provided an internal combustion engine comprising: a spark plug protruding into a combustion chamber, wherein the spark plug comprises a central electrode and a ground electrode, and is configured such that a spark is generated between the central electrode and the ground electrode by electrical discharge, the spark plug has a vortex generator that separates an air flow near the ground electrode from the ground electrode and generates a trailing vortex at a downstream side, and the central electrode and the ground electrode are placed in a manner such that a spark or a flame deformed by an air flow flowing between the central electrode and the ground electrode enters the trailing vortex or the spark penetrates through the inside of the trailing vortex.

BRIEF DESCRIPTION OF DRAWINGS

Embodiment(s) of the present disclosure will be described by reference to the following figures, wherein.

DESCRIPTION OF EMBODIMENTS

Figure 1:
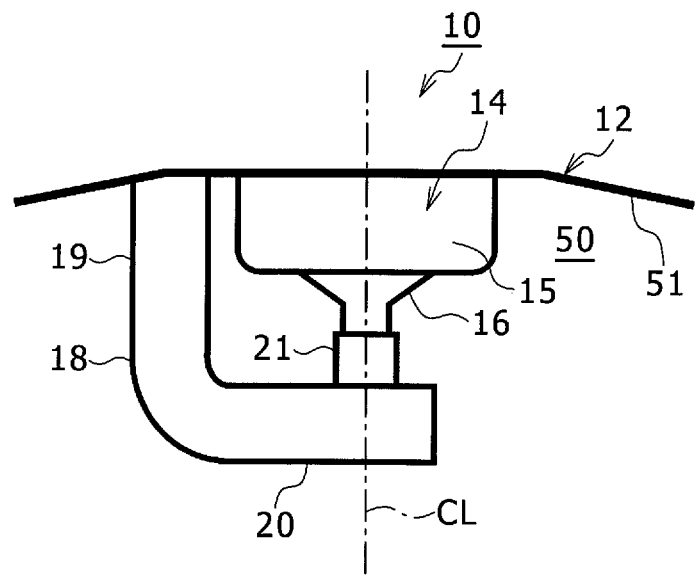
FIG. 1 is a diagram showing a combustion chamber portion including a spark plug in an internal combustion engine according to an embodiment of the present disclosure.

An embodiment of the present disclosure will now be described with reference to the drawings. A shape, a material, and an attachment position described below are merely exemplary for the purpose of the description, and may be suitably changed according to the specification of the internal combustion engine. In the following, if a plurality of embodiments and modified configurations are described, these configurations may be suitably combined and practiced. In the following, the same reference numerals are assigned to equivalent elements throughout all drawings. In the description of this text, reference numerals that are already referred to may be repeatedly used as necessary.

In the following, a configuration will be explained in which a spark plug is attached to an upper part of a cylinder head, but the direction faced by the spark plug and the attachment position are not limited. For example, when the cylinder extends along a slanted up-and-down direction, the spark plug may be attached to the cylinder head facing the slanted up-and-down direction accordingly.

Figure 2:
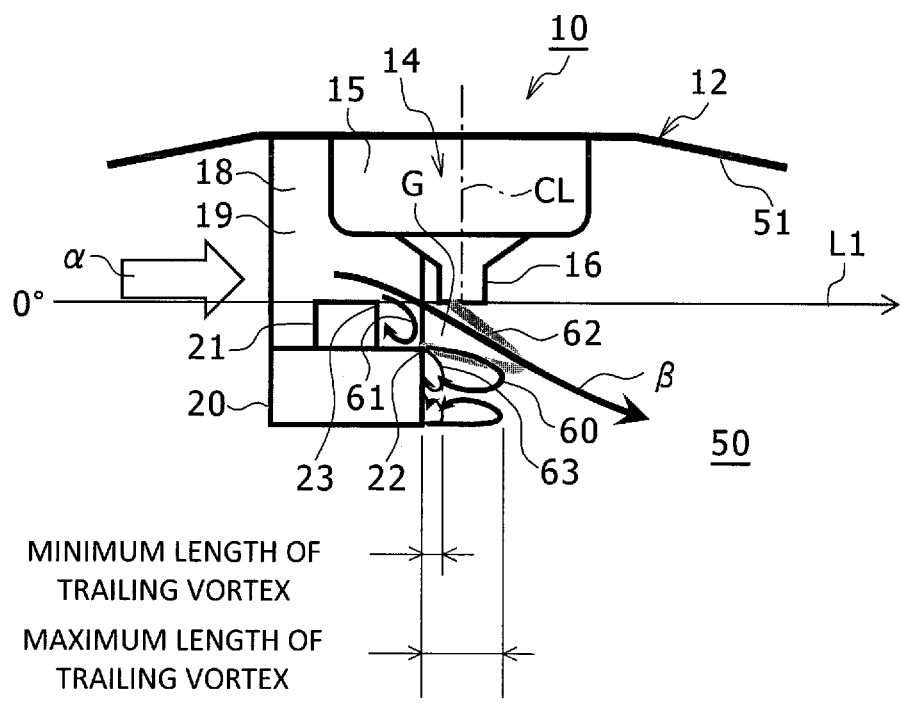
FIG. 2 is a diagram viewing FIG. 1 from right to left.

FIG. 1 is a diagram showing a portion of a combustion chamber 50 including a spark plug 14 in an internal combustion engine 10 according to an embodiment of the present disclosure. FIG. 2 is a diagram of FIG. 1 viewed from right to left.

The internal combustion engine 10 comprises a cylinder head 12, and a cylinder member and a piston (not shown). The cylinder head 12 is combined with the cylinder member to form the combustion chamber 50 inside the combined structure. The piston is placed to be able to reciprocate in the axial direction at an inner side of a cylinder hole formed in the cylinder member.

The internal combustion engine 10 is, for example, a gasoline engine. In such an internal combustion engine 10, a gas mixture of fuel and air is introduced from an intake port (not shown) into the combustion chamber, compressed, ignited, and combusted, and is discharged from an exhaust port (not shown) as combustion gas.

The internal combustion engine 10 is configured such that an intake flow by the gas mixture forms a vertical vortex which is called a tumble flow in the combustion chamber 50 when the mixture gas is introduced into the combustion chamber 50. Even after the intake step, compression step, and the ignition step, a component of the vertical vortex remains in the combustion chamber 50.

Meanwhile, the spark plug 14 is attached to the upper part of the cylinder head 12. The spark plug 14 is placed to protrude toward the lower side from the cylinder head 12 in the combustion chamber 50.

The spark plug 14 comprises a metal fitting housing (not shown) formed in an outer tubular shape, and an insulator 15 held inside the metal fitting housing, and a tip of the insulator 15 protrudes toward the inside of the combustion chamber 50. At the protruding tip of the insulator 15, a central electrode 16 is provided. A central axis CL of the central electrode 16 coincides with the central axis of the insulator 15.

The spark plug 14 is attached to the cylinder head 12 by a thread connection by a male screw portion (not shown) formed on an outer circumferential surfaced of the metal fitting housing.

The spark plug 14 includes a ground electrode 18 extending from a lower end of the metal fitting housing into the combustion chamber 50. The spark plug 14 is configured to generate a spark between the central electrode 16 and the ground electrode 18 by electrical discharge, and is used for igniting the gas mixture. In the following, a configuration will be described in which the spark plug 14 is placed near a center portion of an upper wall surface 51 of the combustion chamber 50.

The ground electrode 18 comprises an extension portion 19 which extends from the metal fitting housing into the combustion chamber 50, and an arm 20 which is bent in an L shape from the tip of the extension portion 19 and which extends to the side opposing the tip (lower end of FIGS. 1 and 2) of the insulator 15. At a tip of the arm 20, a circular pillar-shaped protrusion 21 is formed on a portion opposing the tip of the insulator 15.

As shown in FIG. 2, the ground electrode 18 is placed at a position different from the central axis CL so that the protrusion 21 does not oppose the direction of the central axis CL with respect to the tip of the central electrode 16. A gap formed between the protrusion 21 of the ground electrode 18 and the tip of the central electrode 16 is an electrical discharge gap G in which the spark is generated at the time of electrical discharge.

As described above, in the internal combustion engine 10, because the vertical vortex component remains in the combustion chamber 50 in the ignition period, a lateral air flow which is positioned slightly above the center of the vertical vortex and having a relatively high flow rate is generated near the electrode of the spark plug 14. For the combustion cycle of the internal combustion engine 10, if the cycle variation of the air flow is averaged, the central electrode 16 and the ground electrode 18 of the spark plug 14 are exposed to an air flow flowing from the intake port side toward the exhaust port side. FIG. 2 shows a flow direction of this air flow with an arrow α.

The protrusion 21 which is the tip portion of the ground electrode 18 is placed at the upstream side (left of FIG. 2) of the air flow around the spark plug 14 with respect to the tip of the central electrode 16. With such a configuration, by the air flow around the electrode, trailing vortexes 60 and 61 as shown in FIG. 2 are formed near the ground electrode 18 at the downstream side of the ground electrode 18.

Specifically, the ground electrode 18 has an arm side separation portion 22 and a protrusion side separation portion 23. The separation portions 22 and 23 correspond to vortex generators. More specifically, at the side of the central electrode 16 which is behind the ground electrode 18 in the air flow direction, an air flow flowing through the electrical discharge gap enters, and forms the trailing vortex 60. In this process, at an upper side surface of the arm 20 of the ground electrode 18, an edge on the side of the central electrode 16 becomes the arm side separation portion 22. The arm side separation portion 22 separates the air flow near the arm 20 from the arm 20 at a back side of the arm 20; that is, the downstream side of the air flow, and generates the trailing vortex 60 at the downstream side.

Meanwhile, at an outer periphery of a tip surface (upper end surface of FIG. 2) of the protrusion 21 of the ground electrode 18, an edge on the side of the central electrode 16 (right on FIG. 2) becomes the protrusion side separation portion 23. The protrusion side separation portion 23 separates the air flow near the protrusion 21 from the protrusion 21 at the back side of the protrusion 21; that is, the downstream side of the air flow, and generates the trailing vortex 61 at the downstream side. The trailing vortexes 60 and 61 are circulation flows generated at the downstream side of the electrode when the flow along the electrode is separated from electrode at the downstream side of the electrode. When the mixture gas is ignited inside the trailing vortexes 60 and 61, as will be described later, a part of the flame is taken in the circulating region of the trailing vortexes 60 and 61, and the combustion gas of a high temperature can be stably held near the downstream side of the electrode.

The central electrode 16 and the ground electrode 18 are placed in a manner such that a spark 62 or the flame, or the spark 62 and the flame deformed by the air flow flowing between the electrodes 16 and 18 enter the trailing vortex 60 at the downstream side of the arm 20. Specifically, the ground electrode 18 and the central electrode 16 are placed such that the air flow passing between the electrodes; that is, the electrical discharge gap G, is bent to a slanted down direction which is a side away from the upper wall surface 51 of the combustion chamber 50, as shown in FIG. 2 by an arrow β. In this process, the tip surface (upper end surface of FIG. 2) of the protrusion 21 of the ground electrode 18 is at approximately the same position in the up-and-down direction which is a direction parallel to the central axis CL, with respect to the tip surface (lower end surface of FIG. 2) of the central electrode 16. With such a configuration, the air flow is bent in the slanted down direction while passing between the electrodes, and the air flow can be easily taken in by the trailing vortex 60.

When the trailing vortex 60 exists near the spark 62 generated between the central electrode 16 and the ground electrode 18, the spark 62 and the flame (broken line γ of FIG. 3A) generated around the spark 62 are taken into and enter the trailing vortex 60. In addition, when the air flow passing between the electrodes is bent in the slanted down direction as described above, as shown in FIG. 2, intermediate portions of the spark 62 and the flame are also bent in the slanted down direction with the air flow. A large portions of the spark 62 and the flame are taken in and enter the trailing vortex 60, and are held.

Figure 3A:
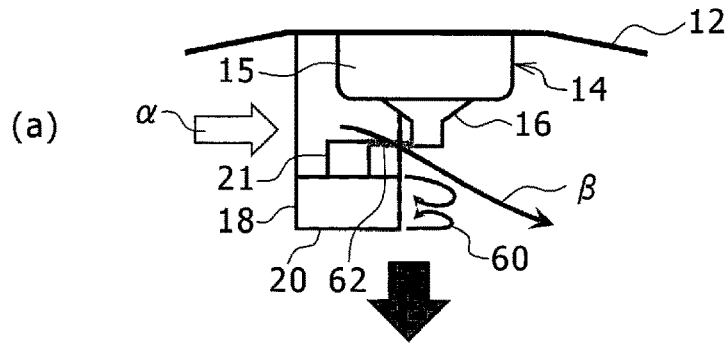
FIG. 3A is a diagram showing a change with respect to time of the spark from start of electrical discharge to entrance to a trailing vortex in FIG. 2.
Figure 3A:
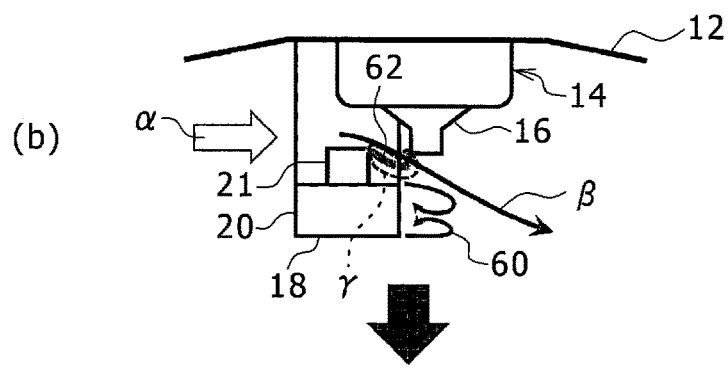
Figure 3A:
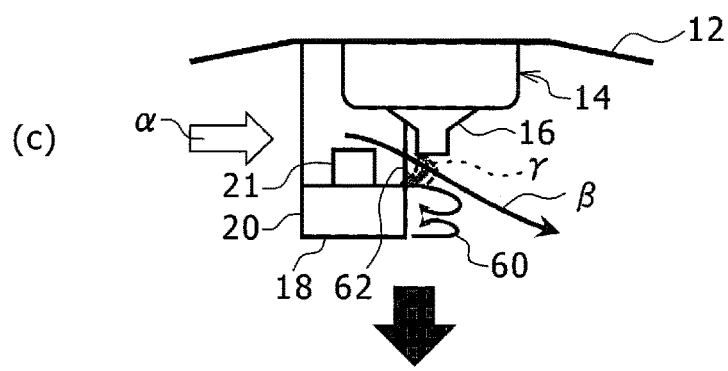
Figure 3A:
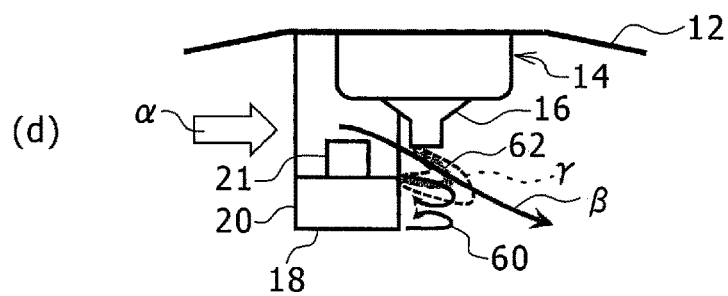

FIG. 3A is a diagram showing a change with respect to time in FIG. 2 from start of electrical discharge to the entrance of the spark 62 into the trailing vortex 60. As shown in FIG. 3A, (a), immediately after start of electrical discharge, the spark 62 may assume an approximate straight line shape connecting, with a minimum path, an end on the side of the ground electrode 18 of the tip surface of the central electrode 16 (left end of FIG. 3A, (a)) and an end on the side of the central electrode 16 at the tip surface of the protrusion of the ground electrode 18 (right end of FIG. 3A, (a)). This happens with a high probability.

Then, as shown in FIG. 3A, (b), the spark 62 is deformed by the air flow flowing in the intermediate portion of the spark 62 to the downstream side. When the spark 62 is further deformed by the air flow, a part of the spark 62 moves closer to the end on the side of the central electrode 16 on the upper surface of the arm 20 of the ground electrode 18. In this process, the spark 62 is formed on a path having a small electricity resistance. Thus, a position of the root of the spark 62 moves from the tip of the protrusion 21 of the ground electrode 18 to the end on the side of the central electrode 16 on the upper surface of the arm 20 (FIG. 3A, (c)).

Then, as shown in FIG. 3A, (d), the intermediate portion of the spark 62 is further deformed by the air flow to be bent toward the downstream side, and enters and is taken into the trailing vortex 60 behind the arm 20 of the ground electrode 18. In this process, the spark 62 passes inside the trailing vortex 60.

In such electrical discharge, the spark 62 supplies heat to the periphery and ignites the gas mixture. The flame which is generated by the ignition is deformed by the air flow flowing in the flame, similar to the spark 62. In FIG. 3A, (b), (c), and (d), the flame is shown by a broken line γ surrounding the spark 62. In addition, immediately after the start of electrical discharge, a spark may be formed connecting, in an approximate straight line shape, an end on the side of the ground electrode 18 from the center of the tip surface of the central electrode 16 (left end of FIG. 3A, (a)) and an end on the side of the central electrode 16 at the upper surface of the arm 20 of the ground electrode 18 (right end of FIG. 3A, (a)). In this case, the process starts from a state near FIG. 3A, (c) described above, and then proceeds to the state of FIG. 3A, (d), and the spark or the flame enters and is taken in the trialing vortex 60, similar to the above-described case.

When the trailing vortex 60 is generated behind the arm 20 of the ground electrode 18, the flame generated by the spark 62 passing through the inside of the trailing vortex 60 is taken into the inside of the circulation flow of the trailing vortex 60. With such a process, the combustion gas of a high temperature can be stably held at a portion immediately near the ground electrode 18 on the downstream side. By the heat of the combustion gas which is held, the non-combusted gas which flows by the air flow is continuously ignited, and the flame can be stably held. The stable holding of the combustion gas and the flame in such a field having an air flow is called "flame holding." With such a process, even after the electrical discharge of the spark 62 is completed, it becomes possible to continuously ignite the non-combusted gas around the spark plug 14, and combustion can be promoted and stabilized. As a result, the energy necessary for stable ignition can also be reduced as compared to the ignition method of the related art.

Similar to the spark 62, the flame also flows by the air flow. Thus, by the air flow passing between the electrodes and flowing in the slanted down direction, the flame is taken into the trailing vortex 60 behind the arm 20 of the ground electrode 18. With this process, the flame holding can be achieved also by a part of the flame ignited at the upstream side of the trailing vortex 60.

Figure 3B:
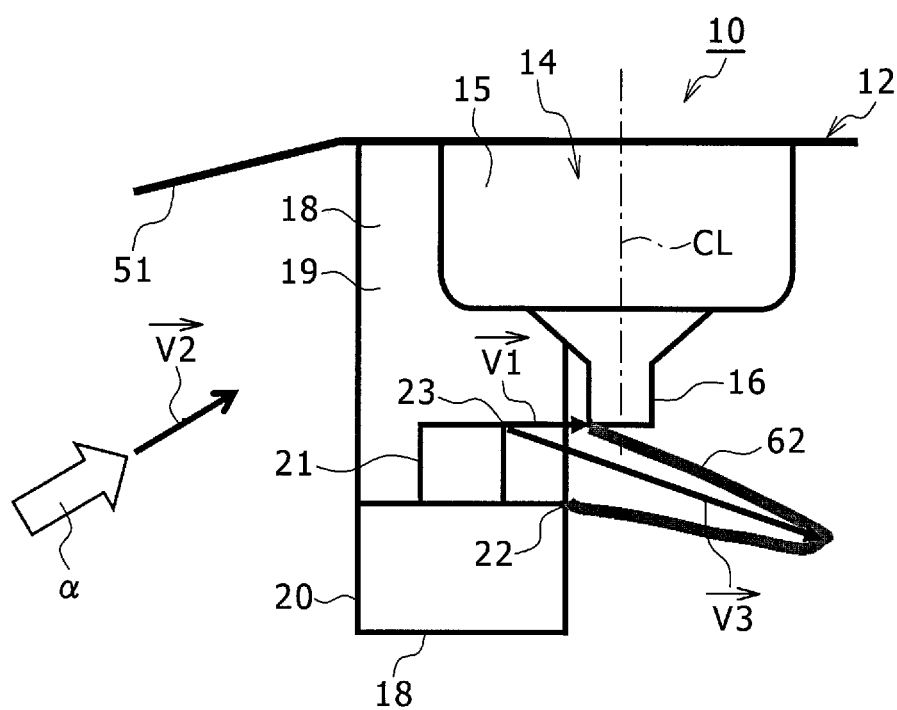
FIG. 3B is a diagram showing a vector for determining a range of a backward length of the trailing vortex shown in FIG. 2.

FIG. 3B is a diagram showing a vector for determining a range of a backward length of the trailing vortex 60 shown in FIG. 2. In order to determine this range, an electrode connection vector V1 and a front side air flow unit vector V2 are defined. The electrode connection vector V1 is a vector from an end on the side of the central electrode 16 at the tip surface of the protrusion 21 of the ground electrode 18 (right end of FIG. 3B) toward an end on the side of the protrusion 21 at the tip surface of the central electrode 16 (left end of FIG. 3B). Further, the front side air flow unit vector V2 is a unit vector in a direction of the front air flow (direction of an arrow α) which is the upstream side of the spark plug 14. In the example configuration of FIG. 3B, the air flow direction is inclined with respect to the direction of the central axis CL of the central electrode 16 in front of the spark plug 14 in the combustion chamber 50.

Figure 4:
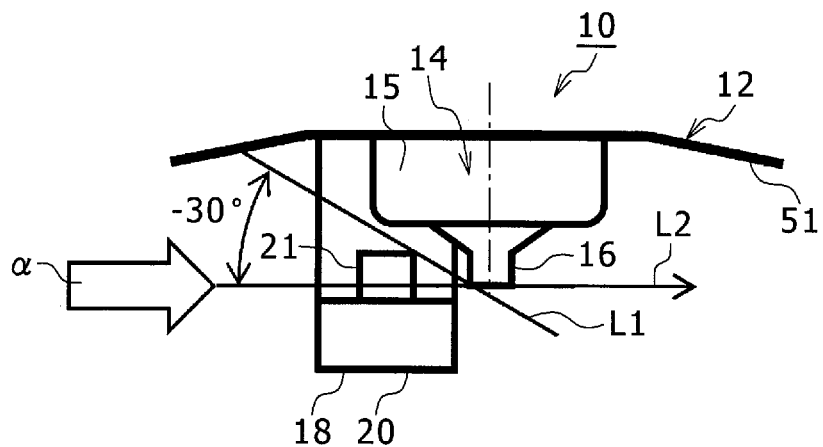
FIG. 4 is a diagram corresponding to FIG. 2, showing an alternative configuration of the internal combustion engine according to the embodiment of the present disclosure.
Figure 5:
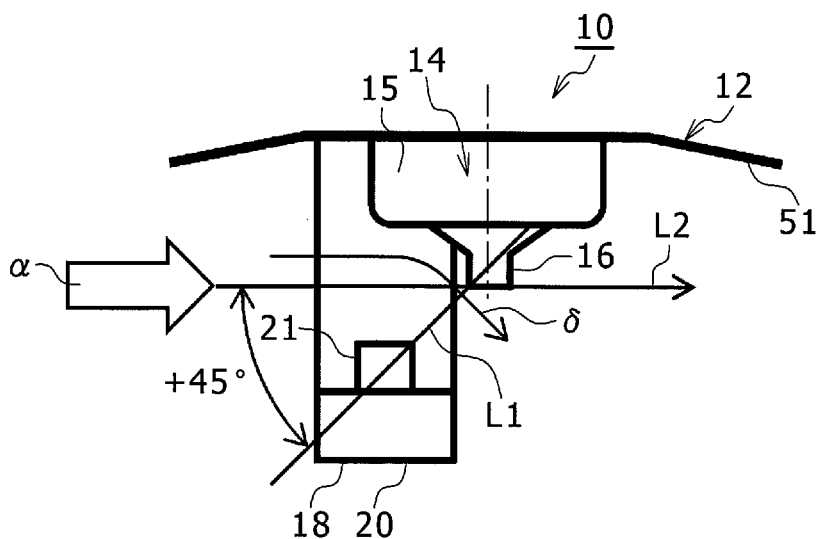
FIG. 5 is a diagram corresponding to FIG. 2, showing an alternative configuration of the internal combustion engine according to the embodiment of the present disclosure.

A range of an angle between the electrode connection vector V1 and the front side air flow unit vector V2 is desirably restricted between −30° and +45°. In this case, a straight line L1 is defined connecting the end on the side of the central electrode 16 on the tip surface of the protrusion 21 of the ground electrode 18 (right end of FIG. 2) and the end on the side of the protrusion 21 on the tip surface of the central electrode 16 (left end of FIG. 2). An angle between the straight line L1 and the direction of the air flow in front of the spark plug 14 (direction of the arrow α) is restricted between −30° and +45°. In the example configuration of FIG. 2, an angle between the straight line L1 and the direction α of the air flow is 0°. As shown in FIG. 4 to be described later, when the direction from the upper end of the ground electrode 18 toward the lower end of the central electrode 16 is more downward than the flow direction α of the air flow; that is, on the side away from the upper wall surface 51 (for example, slanted downward side of FIG. 4), the angle between the straight line L1 and the direction α of the air flow is a negative angle. On the other hand, as shown in FIG. 5 to be described later, when the direction from the upper end of the ground electrode 18 toward the lower end of the central electrode 16 is more upward than the flow direction α of the air flow; that is, on the side approaching the upper wall surface 51 (for example, slanted upward in FIG. 5), the angle between the straight line L1 and the direction α of the air flow is a positive angle.

Referring back to FIG. 2, a length of a portion flowing backward of the trailing vortex 60 behind the arm 20 of the ground electrode 18 (which is a direction orthogonal to the central axis of the central electrode 16 in FIG. 2; right side of FIG. 2) is defined as "backward length of the trailing vortex 60." A minimum value for the backward length of the trailing vortex 60 is an inner product between the electrode connection vector V1 and the front side air flow unit vector V2 (FIG. 3B), starting at the starting point of the electrode connection vector V1 (FIG. 3B). FIG. 2 also shows a trailing vortex 63 having a minimum backward length. In addition, the maximum value of the backward length of the trailing vortex 60 is an inner product of a longest spark vector V3 and the front side air flow unit vector V2 (FIG. 3B), starting at a starting point of the longest spark vector V3 (FIG. 3B) connecting the end on the side of the central electrode 16 at the tip surface of the protrusion 21 (right end of FIG. 3B) and a longest length reaching point of the spark 62 deformed by the air flow.

According to the internal combustion engine 10 described above, stabilization of ignition, promotion of combustion, and stabilization of combustion can be realized with an energy equivalent or less than that required in the related art, even under a flame resisting condition such as high flow rate of the air flow and dilute combustion (lean A/F, EGR dilution).

In addition, because the minimum value and the maximum value of the backward length of the trailing vortex 60 behind the arm 20 of the ground electrode 18 are restricted to the above-described ranges, there can be easily realized a structure which can capture the spark 62 and the flame around the spark 62 in the trailing vortex 60, to thereby achieve promotion of combustion and stabilization of combustion.

FIGS. 4 and 5 are diagrams corresponding to FIG. 2, and showing two alternative configurations of the internal combustion engine 10 according to the embodiment. In the example configuration of FIG. 4, an upper end of the protrusion 21 which is the tip of the ground electrode 18 is placed at an upper position in relation to a lower end of the tip of the central electrode 16. In addition, an angle between the straight line L1 and the air flow direction α in front of the spark plug 14 along the straight line L2 is −30°. In the above-described configuration, the tip of the protrusion 21 of the ground electrode 18 significantly approaches the tip of the insulation insulator 15 (lower end of FIG. 4), and thus, the air flow passing between the electrodes is rapidly bent slanted downward. In such a structure, a length in the up-and-down direction of a portion, of the spark plug 14, placed inside the combustion chamber 50 can be reduced.

In the example configuration of FIG. 5, an upper end of the protrusion 21 which is the tip of the ground electrode 18 is placed at a lower position than a lower end of the tip of the central electrode 16. An angle between the straight line L1 and the direction of air flow α in front of the spark plug 14 along the straight line L2 is +45°. In the above-described configuration, the air flow which flows to collide from the left side of FIG. 5 onto the central electrode 16 is bent in the slanted downward side as shown by an arrow δ, and thus, the air flow passing between the electrodes at the lower side is also bent toward a slanted downward side.

Figure 6:
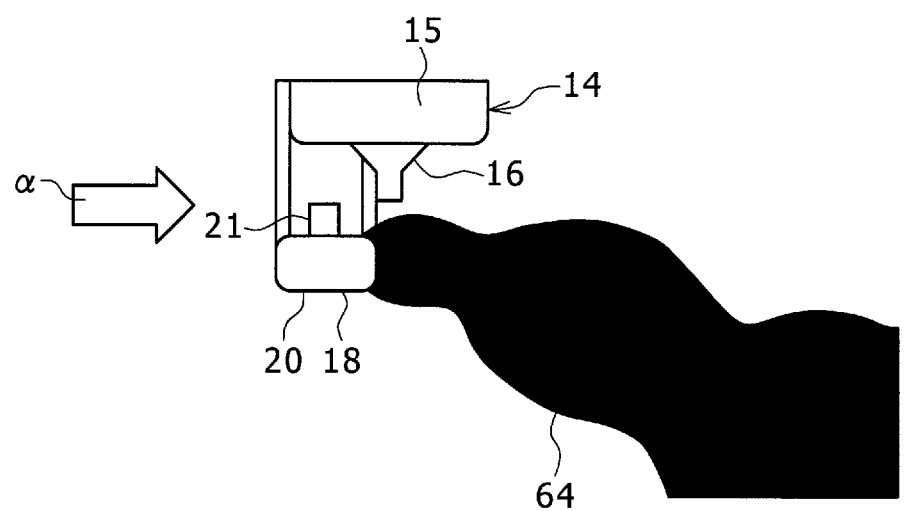
FIG. 6 is a diagram showing a result of simulation executed for checking advantages of the embodiment of the present disclosure.

FIG. 6 is a diagram showing a result of a simulation executed for checking the advantages of the embodiment. In the simulation, a configuration similar to that of the embodiment shown in FIGS. 1 and 2 is used. In the simulation, a phenomenon from ignition of the spark to the ignition of the mixture gas was calculated using a general-purpose fluid analyzing software "STAR-CD" manufactured by CD-adapco. As can be understood from the simulation result shown in FIG. 6, for the flow direction α of the air flow, flame holding is achieved at the back of the ground electrode 18 (right side of FIG. 6), and the flame 64 is continuously spread from the back thereof. Thus, it has been confirmed that combustion can be stabilized.

Figure 7A:
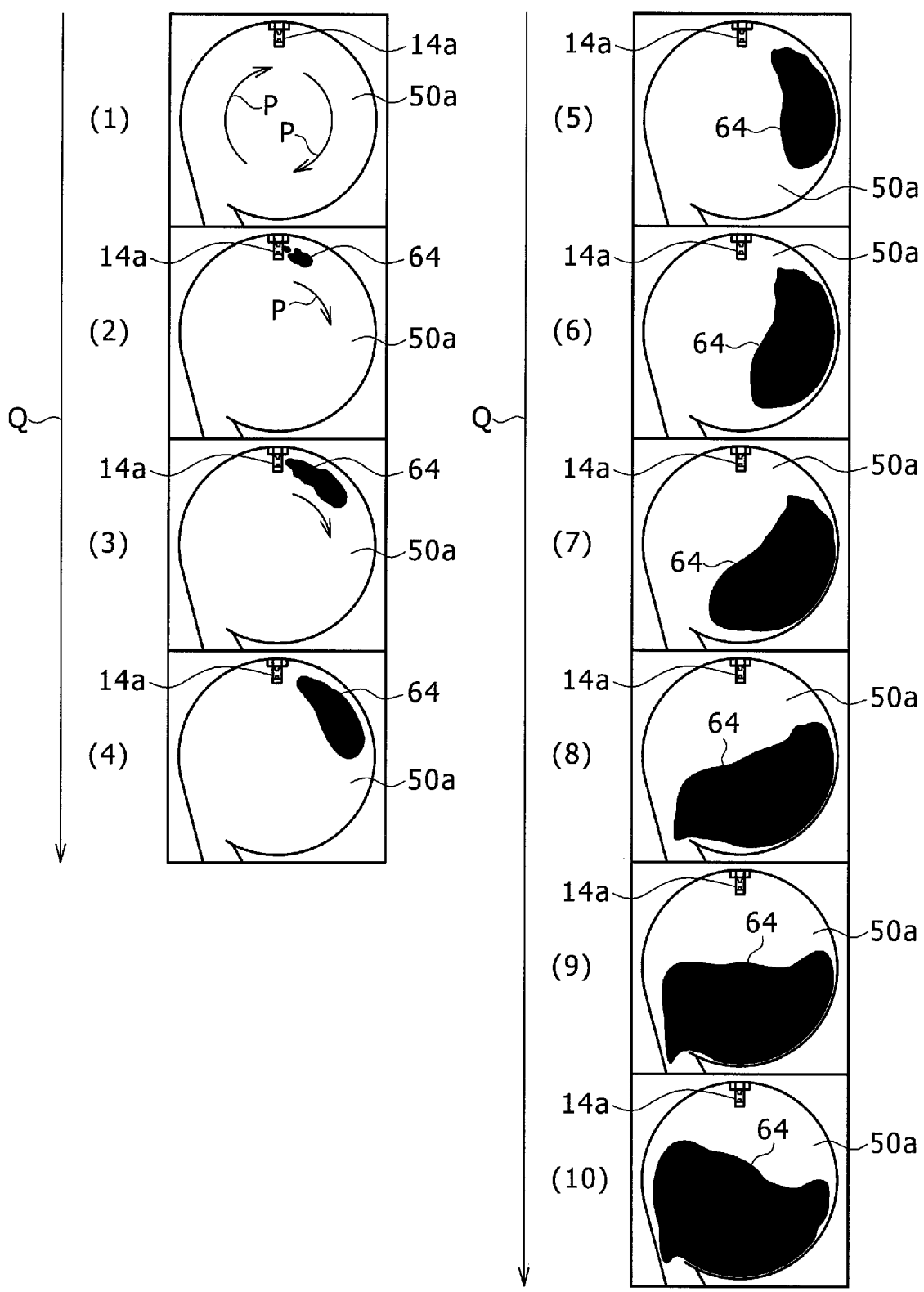
FIG. 7A is a diagram showing a result of simulation of a change with respect to time of a simulated model corresponding to an internal combustion engine of a Comparative Example, when a flame is spread in the combustion chamber after electrical discharge.

FIG. 7A is a diagram showing a result of a simulation of a change with respect to time of the flame 64 after the electrical discharge and when the flame 64 spreads in the combustion chamber 50a, in a simulation model corresponding to the internal combustion engine 10 of a Comparative Example. In this model, the combustion chamber 50a is a container of a circular disc shape, and the spark plug 14a protrudes toward the inner side. Inside the combustion chamber 50a, an air flow circulating in a direction shown by an arrow P in FIG. 7A, (1) is generated. In the Comparative Example shown in FIG. 7A, the spark plug 14a has a structure which is generally known in the related art, and, in the embodiment shown in FIGS. 1 and 2, the protrusion of the ground electrode opposes the axial direction of the central electrode.

In FIG. 7A, the state of the spreading of the flame 64 from the ignition of the spark and generation of fire in the Comparative Example is shown with elapse of time, and the time elapses in the direction of an arrow Q; that is, in the order of (1), (2), . . . (10). As can be understood from the simulation result of FIG. 7A, in the Comparative Example, after the ignition of the spark, the flame 64 spreads and grows from the spark plug 14a in the direction of the arrow P, but there is no flame holding near the downstream side of the spark plug 14a, and the flame 64 grows separately from the spark plug 14a. Based on this result, it can be deduced that progress of combustion is slowed and the combustion becomes unstable in the Comparative Example.

Figure 7B:
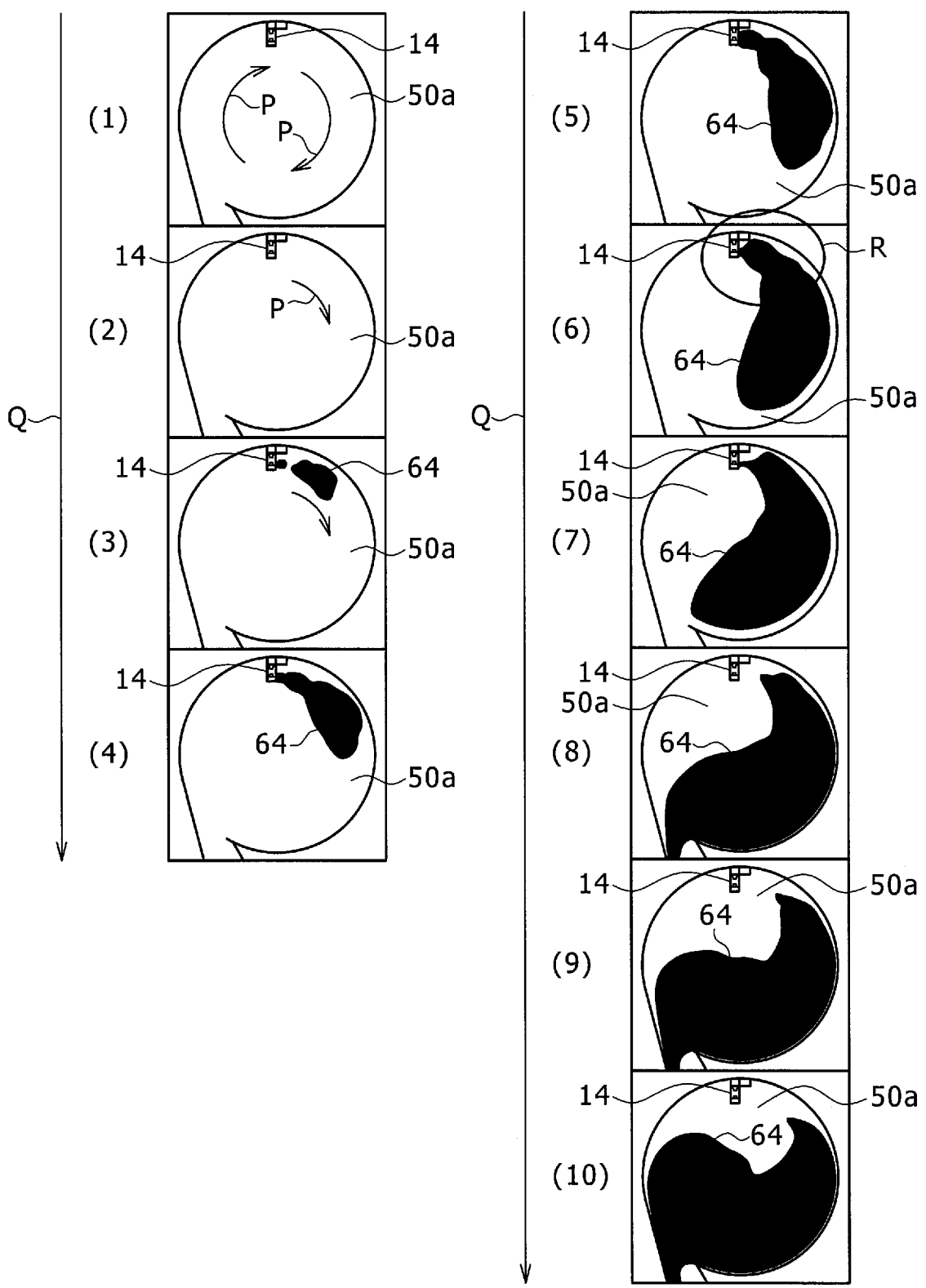
FIG. 7B is a diagram showing a result of simulation of a change with respect to time of a simulated model corresponding to the internal combustion engine of the embodiment, when the flame is spread in the combustion chamber after electrical discharge.

Meanwhile, FIG. 7B is a diagram showing a result of simulation of change with respect to time of the flame after the electrical discharge when the flame spreads in the combustion chamber 50a, in a simulation model corresponding to the internal combustion engine 10 of the embodiment. In this model also, similar to the Comparative Example of FIG. 7A, the spark plug 14 protrudes toward the inner side of the combustion chamber 50a having a circular disc shape. In the embodiment of FIG. 7B, the spark plug 14 has a structure similar to that of the embodiment shown in FIGS. 1 and 2. Further, in the simulation whose result is shown in FIG. 7B, conditions other than the shape of the spark plug 14 are identical to those of the simulation whose result is shown in FIG. 7A. Specifically, the temperature, the pressure, the flow rate, the mixture gas concentration, and the ignition energy inside the combustion chamber are identical between the simulations whose results are shown in FIGS. 7A and 7B.

Similar to FIG. 7A, FIG. 7B also shows the state of spreading of the flame from the ignition of the spark and generation of fire, with elapse of time. The time elapses in the direction of the arrow Q; that is, in the order of (1), (2), . . . (10). As can be understood from the simulation result of FIG. 7B, in the embodiment, the flame 64 continuously spreads from a region near the downstream side of the spark plug 14 as shown from (4) to (7), and the flame is held near the downstream side of the spark plug 14. In particular, in FIG. 7B, (6), it can be confirmed that flame holding as intended is achieved by a portion surrounded by a frame R. Based on this result, it was confirmed that, in the embodiment, stabilization of ignition, promotion of combustion, and stabilization of combustion can be realized with an energy equivalent or less than that of the related art, even under a flame-resisting condition such as high flow rate.

Figure 8A:
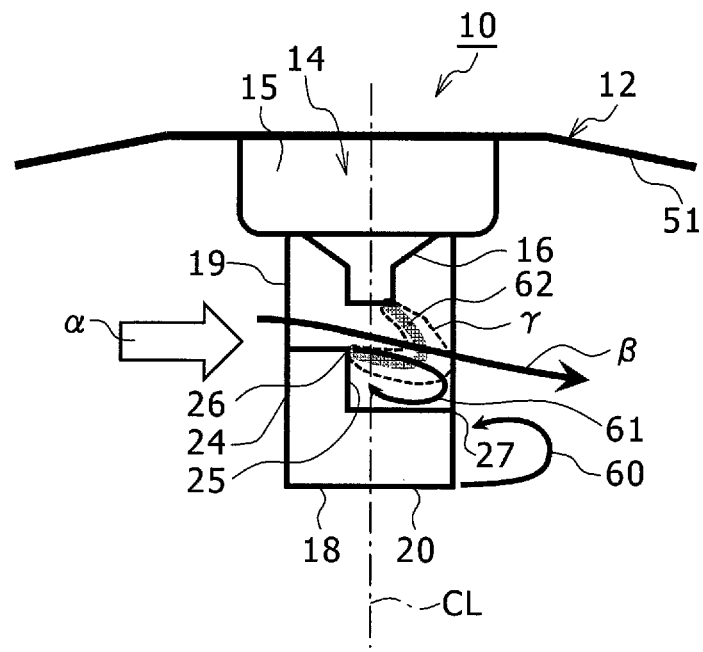
FIG. 8A is a diagram corresponding to FIG. 2, showing an alternative configuration of the internal combustion engine according to the embodiment of the present disclosure.
Figure 8B:
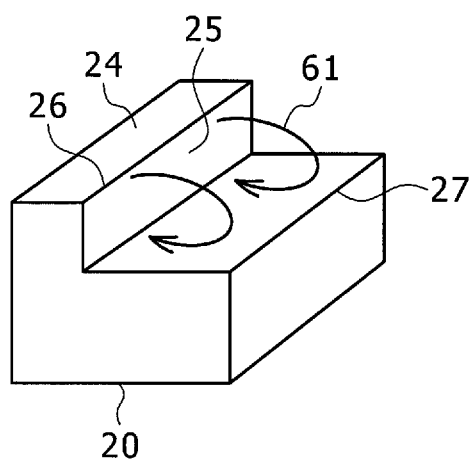
FIG. 8B is a perspective diagram showing, in the structure of FIG. 8A, a portion, of the ground electrode, facing the central electrode in a direction of a central axis.

FIG. 8A is a diagram corresponding to FIG. 2, showing an alternative configuration of the internal combustion engine 10 of the embodiment. FIG. 8B is a perspective diagram showing a portion, of the ground electrode 18 in the structure shown in FIG. 8A, opposing the central electrode 16 in a direction of the central axis CL.

In the alternative configuration of FIG. 8A, in the ground electrode 18 of the spark plug 14, on an upper side surface of the arm 20 having a rectangular parallelepiped shape as shown in FIG. 8B, a protrusion 24 having a rectangular parallelepiped shape is formed in a manner to protrude on an end on the upstream side in the flow direction of the air flow (in the direction of the arrow α in FIG. 8A). The protrusion 24 is placed over approximately the entire length of the arm 20 in a front-back direction of the sheet of FIG. 8A. With such a configuration, a step 25 is formed on the upper side surface of the arm 20. The protrusion 24 is placed at an upstream side (left side of FIG. 8A) of the flow direction α of the air flow around the spark plug 14, with respect to the tip of the central electrode 16. The protrusion 24 corresponds to the tip portion of the ground electrode 18. As shown by the arrow β in FIG. 8A, the air flow passing between the electrodes is bent in the slanted downward direction. With such a configuration, a downstream side edge of the tip surface of the protrusion 24 (upper side surface of FIG. 8A) becomes a protrusion side separation portion 26 which generates the trailing vortex 61 at a back side of the protrusion 24. In addition, a downstream side edge of the upper side surface of the arm 20 becomes an arm side separation portion 27 which generates the trailing vortex 60 at the back side of the arm 20.

According to the above-described configuration, at a region near the protrusion 24 and at the downstream side of the protrusion 24, the trailing vortex 61 is generated by a back step flow. Moreover, a spark 62 is generated between the downstream side edge of the tip surface of the protrusion 24 (upper side surface of FIGS. 8A and 8B) and the central electrode 16, and an intermediate portion of the spark 62 is deformed to be bent in the slanted downward direction of FIG. 8A by the air flow flowing in the arrow direction α. As shown in FIG. 8A, the spark 62 and the flame shown by the broken line γ are taken into the trailing vortex 61 and are held. With such a configuration, stabilization of ignition, promotion of combustion, and stabilization of combustion can be realized with an energy equivalent to or less than that of the related art. The other structures and operations are similar to those of the configuration shown in FIGS. 1-5.

Figure 9:
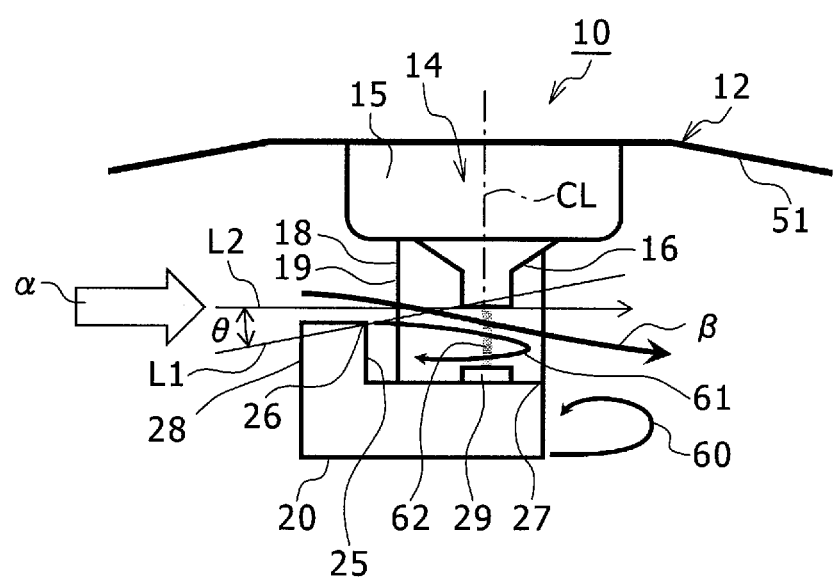
FIG. 9 is a diagram corresponding to FIG. 2, showing an alternative configuration of the internal combustion engine according to the embodiment of the present disclosure.

FIG. 9 is a diagram corresponding to FIG. 2, showing an alternative configuration of the internal combustion engine 10 of the embodiment. The alternative configuration shown in FIG. 9 is similar to the configuration shown in FIGS. 8A and 8B, except that the end on the upstream side of the flow direction α of the air flow (left end of FIG. 9) extends to the upstream side, significantly distanced from the central electrode 16 in the arm 20 of the ground electrode 18. With an upstream side protrusion 28 having a rectangular parallelepiped shape being formed on the upper surface of the upstream side end of the arm 20, a step 25 is formed. As shown in FIG. 9 with an arrow β, the air flow passing between the electrodes is bent in the slanted downward direction. With such a configuration, the downstream side edge of the tip surface of the upstream side protrusion 28 becomes a protrusion side separation portion 26 which generates the trailing vortex 61 at the back side of an upstream side protrusion 28. In addition, the downstream side edge of the upper side surface of the arm 20 becomes the arm side separation portion 27 which generates the trailing vortex 60 at the back side of the arm 20.

Further, on the upper surface of the arm 20, a downstream side protrusion 29 having a circular disc shape or a circular pillar shape is formed so that a tip surface thereof opposes the tip surface of the central electrode 16 in the direction of the central axis CL.

In such a configuration, by the upstream side protrusion 28 of the ground electrode 18, the trailing vortex 61 is formed, which is a circulation flow of the form of the back step flow, behind the upstream side protrusion 28. At the start of the electrical discharge, the spark 62 is generated between the tip surface of the central electrode 16 and the tip surface of the downstream side protrusion 29 of the ground electrode 18. The spark 62 is formed so that the spark 62 penetrates through the trailing vortex 61 in the form of the back step flow, from the instant the spark 62 is generated. With such a configuration, the ground electrode 18 and the central electrode 16 are placed so that the spark 62 penetrates through the inside of the trailing vortex 61. Because of this, the inside of the trailing vortex 61 can be directly ignited by the spark discharge, and the flame can be taken into the trailing vortex 61. With the flame taken into the trailing vortex 61, the flame can be held near the ground electrode 18, and the non-combusted gas at the periphery thereof can be continuously ignited. The other structures and operations are similar to those of the configuration of FIGS. 1-5.

Similar to the configuration of FIGS. 1-5, in the configuration of FIG. 9 also, a straight line L1 is defined connecting the end on the side of the central electrode 16 on the tip surface of the upstream side protrusion 28 of the ground electrode 18 (right end of FIG. 9) and the end on the side of the upstream protrusion 28 on the tip surface of the central electrode 16 (left end of FIG. 9). Desirably, an angle θ between the straight line L1 and a direction of the air flow in front of the spark plug 14 along the straight line L2 (direction of the arrow α) is restricted to −30° to +45°. In FIG. 9, similar to FIG. 5, a configuration is shown in which the angle θ is positive.

Figure 10:
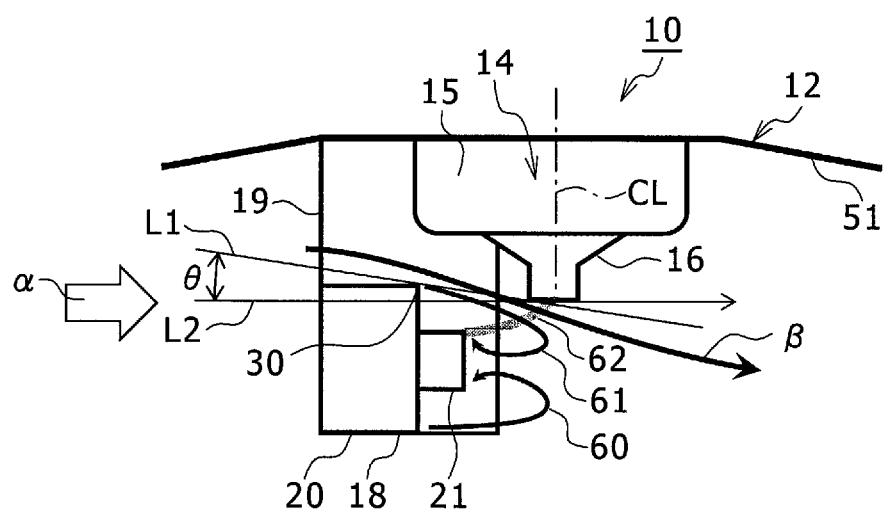
FIG. 10 is a diagram corresponding to FIG. 2, showing an alternative configuration of the internal combustion engine according to the embodiment of the present disclosure.

FIG. 10 is a diagram corresponding to FIG. 2, showing an alternative configuration of the internal combustion engine 10 of the embodiment. The alternative configuration shown in FIG. 10 is similar to the configuration of FIGS. 1-5, except that the arm 20 of the ground electrode 18 is connected only to the upstream side of the flow direction α of the air flow (left side of FIG. 10) at the lower end of the extension portion 19. The up-and-down direction length of the arm 20 is larger than that of the configuration of FIGS. 1-5.

In addition, in the arm 20, on the side surface on the side of the central electrode 16 (right side of FIG. 10), a protrusion 21 having a circular pillar shape or a circular disc shape is formed in a protruding manner. An axial direction of the protrusion 21 is orthogonal to the direction of the central axis CL of the central electrode 16. The protrusion 21 generates the spark 62 by electrical discharge between the protrusion 21 and the central electrode 16.

The arm 20 corresponds to the tip portion of the ground electrode 18. The arm 20 is placed at the upstream side of the flow direction α of the air flow (left side of FIG. 10) around the spark plug 14 with respect to the tip of the central electrode 16. The upper side surface of the arm 20 is positioned at approximately the same position in the up-and-down direction with respect to the tip surface of the central electrode 16. As shown in FIG. 10 by the arrow β, the air flow passing between the electrodes is bent in the slanted downward direction. With such a configuration, the downstream side edge of the upper side surface of the arm 20 becomes the separation portion 30 which generates the trailing vortex 60 at the back side of the arm 20.

According to the above-described configuration, the trailing vortex 60 can be formed behind the arm 20 by the arm 20 of the ground electrode 18. At the start of the electrical discharge, the spark 62 is generated between the tip surface of the central electrode 16 and the tip surface of the protrusion of the ground electrode 18. The spark 62 is formed to penetrate through the trailing vortex 60 from the instant the spark 62 is generated. With such a configuration, the ground electrode 18 and the central electrode 16 are placed so that the spark 62 penetrates through the inside of the trailing vortex 60. The other structures and operations are similar to those of the configuration shown in FIGS. 1-5 or FIG. 9.

Similar to the configuration of FIGS. 1-5, in the configuration of FIG. 10 also, a straight line L1 is defined connecting the end on the side of the central electrode 16 on the upper end surface of the arm 20 of the ground electrode 18 (right end of FIG. 10) and the end on the side of the arm 20 on the tip surface of the central electrode 16 (left end of FIG. 10). Desirably, an angle θ between the straight line L1 and the direction of the air flow in front of the spark plug 14 along the straight line L2 (direction of the arrow α) is restricted to −30° to +45°. In FIG. 10, similar to FIG. 4, a configuration is shown in which the angle θ is negative.

Figure 11:
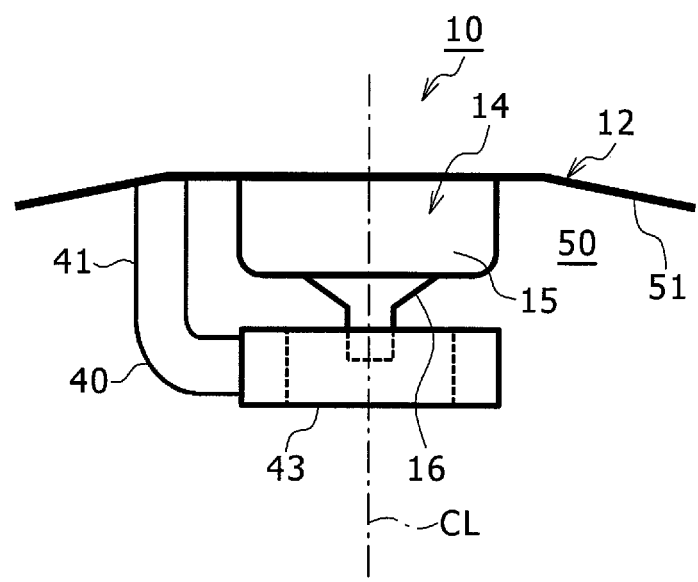
FIG. 11 is a diagram corresponding to FIG. 1, showing an alternative configuration of the internal combustion engine according to the embodiment of the present disclosure.
Figure 12:
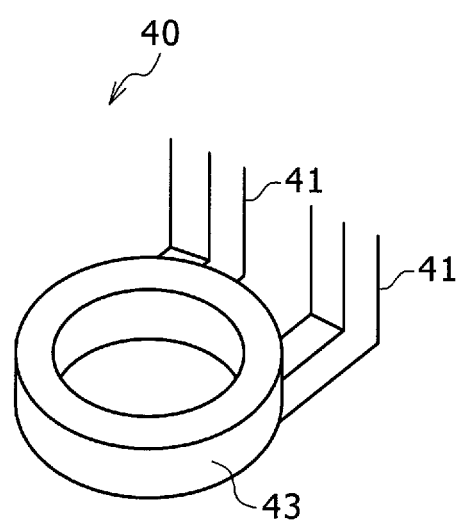
FIG. 12 is a perspective diagram of the ground electrode in the structure of FIG. 11.

FIG. 11 is a diagram corresponding to FIG. 1, showing an alternative configuration of the internal combustion engine 10 of the embodiment. FIG. 12 is a perspective diagram of a ground electrode 40 in the configuration shown in FIG. 11, and FIG. 13 is a diagram viewing FIG. 11 from right to left.

Figure 13:
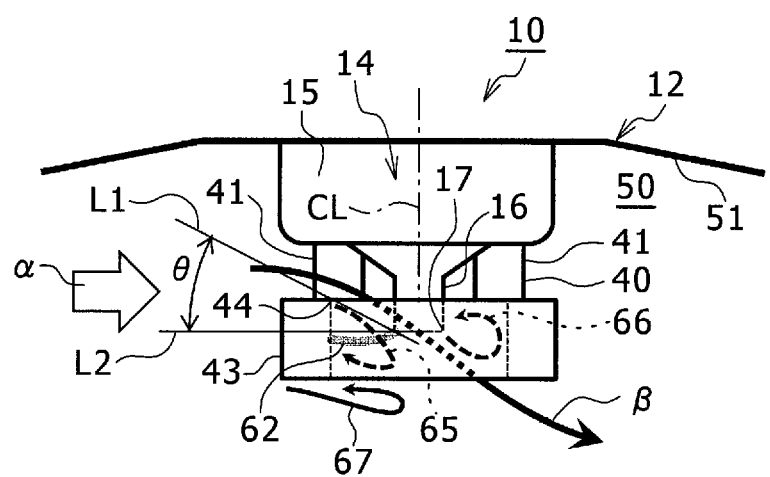
FIG. 13 is a diagram showing FIG. 11 from right to left.

The structure of the alternative configuration of FIGS. 11-13 is similar to the structure of FIGS. 1-5, with the ground electrode 40 having two extension portions 41 extending from a metal fitting housing (not shown) into the combustion chamber 50, and a ring portion 43 having a tubular shape coupled to the two extension portions 41. Each extension portion 41 has a tip bent in an L shape toward the side opposing the tip of the insulator 15. The tips of the two extension portions 41 are coupled to an outer circumferential surface of a half on one side with respect to a diameter direction of the ring portion 43.

Further, the tip of the central electrode 16 is inserted from the upper side to a region near the center in the inside of the ring portion 43. The ring portion 43 corresponds to the tip portion of the ground electrode 18. The spark 62 is generated by the electrical discharge between the inner circumferential surface of the ring portion 43 and the tip of the central electrode 16.

As shown in FIG. 13, a part of the circumferential direction of the ring portion 43 (left end of FIG. 13) is placed at the upstream side of the flow direction α of the air flow (left side of FIG. 13) around the spark plug 14 with respect to the tip of the central electrode 16. An upper end surface of the ring portion 43 is positioned at approximately the same position in the up-and-down direction with respect to the tip surface of the central electrode 16. As shown in FIG. 13 by an arrow β, the air flow passing between the electrodes is bent in the slanted downward direction. With such a configuration, at the inner circumferential edge of the upper end surface of the ring portion 43, the half on the one side positioned at the upstream side of the air flow (half on the left side of FIG. 13) becomes a ground electrode side separation portion 44 which generates a trailing vortex 65 at the inside of the ring portion 43. The ground electrode side separation portion 44 corresponds to a first vortex generator which separates the air flow near the ground electrode 40 and generates the trailing vortex 65 at the downstream side.

According to the above-described configuration, the trailing vortex 65 can be formed inside the ring portion 43 by the ring portion 43 of the ground electrode 40. At the start of the electrical discharge, the spark 62 is generated between the tip surface of the central electrode 16 and the inner circumferential surface of the ring portion 43. In this process, if the spark 62 is generated in a region, of the inner circumferential surface of the ring portion 43, between the upstream side portion in the flow direction of the air flow and the central electrode 16, the spark 62 is formed to penetrate through the trailing vortex 65 from the instant the spark 62 is generated. With such a configuration, the ground electrode 40 and the central electrode 16 are placed so that the spark 62 penetrates through the inside of the trailing vortex 65.

Moreover, in the structure of the present configuration, at the inside of the ring portion 43, a trailing vortex 66 is generated also behind the tip surface of the central electrode 16 which is the downstream side of the air flow. In this process, at the outer circumference of the tip surface of the central electrode 16, the half on the one side which is the downstream side of the air flow (right side of FIG. 13) becomes a central electrode side separation portion 17 which generates the trailing vortex 66. The central electrode side separation portion 17 corresponds to a second vortex generator which separates the air flow near the central electrode 16 and generates the trailing vortex 66 at the downstream side.

Also, when the spark is generated between a portion, of the inner circumferential surface of the ring portion 43, on the downstream side of the air flow (right side of FIG. 13) and the central electrode 16, the spark can be formed to penetrate the trailing vortex 66 at the back side of the central electrode 16. With such a configuration, the gas mixture can be ignited at the inside of the trailing vortex 66, and the flame can be stably held. In the example configuration of FIG. 13, a trailing vortex 67 is also generated outside of the ring portion 43 (lower side of FIG. 13).

Further, even if dispersion is caused among the combustion cycles for the direction of the air flow around the spark plug 14, the flame can be stably held at the periphery of the ring portion 43. For example, a case may be considered in which the direction of the air flow around the spark plug 14 is opposite the direction of the arrow α of FIG. 13. In this case, the air flow flows at the periphery of the spark plug 14 from the right to the left of FIG. 13. In this case also, the trailing vortex is generated at a portion positioned at the downstream side of the air flow in the inside of the ring portion 43, and thus, the generated spark can penetrate through the trailing vortex when the spark is generated between the ring portion 43 and the central electrode 16, and flame can be stably held. The other structures and operations are similar to those of the configuration of FIGS. 1-5, the configuration of FIG. 9, or the configuration of FIG. 10.

In the case of the configuration of FIGS. 11-13, a straight line L1 is defined connecting the separation portion of the ground electrode 40 and the end on the side of the separation portion of the ground electrode 40 on the tip surface of the central electrode 16. Desirably, an angle between the straight line L1 and the direction of the air flow in front of the spark plug 14 along the straight line L2 (direction of the arrow α) is restricted to −30° to −0°. FIG. 13 shows a case similar to FIG. 4 in which the angle θ is negative.

The internal combustion engine of at least one of the above-described configurations of the embodiment has the structure of the internal combustion engine of the present disclosure. Because of this, the stabilization of ignition, promotion of combustion, and stabilization of combustion can be realized with an energy equivalent to or less than that of the related art, even under flame-resisting conditions.

The invention claimed is:

1. An internal combustion engine comprising:
   a spark plug protruding into a combustion chamber, the spark plug comprising:
   a central electrode; and
   a ground electrode including:
      an arm portion that is bent toward the central electrode; and
      a tip portion that protrudes from a side of the arm portion in a direction opposite to a direction in which the spark plug protrudes into the combustion chamber, such that a spark is generated between the central electrode and the ground electrode by electrical discharge, wherein:
      a downstream end of the tip portion of the ground electrode and a downstream end of the arm portion of the ground electrode are both placed upstream of a tip of the central electrode with respect to an air flow through the combustion chamber;
      the downstream end of the tip portion of the ground electrode is further upstream with respect to the tip of the central electrode than the downstream end of the arm portion of the ground electrode;
      at least one of the downstream end of the tip portion and the downstream end of the arm portion of the ground electrode functions as a vortex generator that separates an air flow near the ground electrode from the ground electrode and generates a trailing vortex at a downstream side;
      the central electrode and the ground electrode are placed in a manner such that the spark or a flame deformed by an air flow flowing between the central electrode and the ground electrode enters the trailing vortex, or the spark penetrates through an inside of the trailing vortex; and
      an angle between (i) a straight line connecting an end on a downstream side of an upper end surface of the ground electrode and an end on an upstream side of a lower end surface of the central electrode and (ii) a direction of an air flow at the upstream side of the spark plug is zero or positive, provided that:
         the angle is positive in a case where a direction from the upper end of the ground electrode toward the lower end of the central electrode is more upward than the direction of the air flow at the upstream side of the spark plug.

2. The internal combustion engine according to claim 1, wherein
   both of the downstream end of the tip portion and the downstream end of the arm portion of the ground electrode function as the vortex generator.

3. The internal combustion engine according to claim 1, wherein the central electrode is provided at a tip of an insulator protruding toward an inside of the combustion chamber.

4. The internal combustion engine according to claim 1, wherein the air flow through the combustion chamber is generated to flow from a side of the arm portion of the ground electrode opposite the central electrode toward the central electrode.

5. The internal combustion engine according to claim 1, wherein:
   an upstream end of the arm portion of the ground electrode is further upstream with respect to the air flow through the combustion chamber than an upstream end of the tip portion of the ground electrode; and
   the downstream end of the arm portion of the ground electrode is further downstream with respect to the air flow through the combustion chamber than the downstream end of the tip portion.

6. The internal combustion engine according to claim 1, wherein the angle is non-zero.

* * * * *